United States Patent
Chang et al.

(10) Patent No.: US 10,450,729 B2
(45) Date of Patent: Oct. 22, 2019

(54) PULL-OUT FAUCET

(71) Applicant: Globe Union Industrial Corp., Taichung (TW)

(72) Inventors: Jihtung Chang, Taichung (TW); Chaota Yang, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 119 days.

(21) Appl. No.: 15/709,585

(22) Filed: Sep. 20, 2017

(65) Prior Publication Data
US 2019/0085538 A1 Mar. 21, 2019

(51) Int. Cl.
*F16K 31/60* (2006.01)
*E03C 1/04* (2006.01)
*F16K 5/08* (2006.01)
*F16K 11/085* (2006.01)

(52) U.S. Cl.
CPC .................. *E03C 1/04* (2013.01); *F16K 5/08* (2013.01); *F16K 11/085* (2013.01); *F16K 31/602* (2013.01); *E03C 2001/0415* (2013.01); *E03C 2001/0416* (2013.01); *E03C 2201/30* (2013.01); *Y10T 137/6014* (2015.04); *Y10T 137/86815* (2015.04); *Y10T 137/86823* (2015.04); *Y10T 137/9029* (2015.04); *Y10T 137/9464* (2015.04)

(58) Field of Classification Search
CPC .................. E03C 1/04; E03C 2201/30; E03C 2001/0415; E03C 1/0403; E03C 2001/0416; Y10T 137/9029; Y10T 137/86823; Y10T 137/6014; Y10T 137/9464

USPC .................................................... 4/677, 678
See application file for complete search history.

(56) References Cited

U.S. PATENT DOCUMENTS

| | | | |
|---|---|---|---|
| 4,901,749 A * | 2/1990 | Hutto | F16K 19/006 137/270 |
| 5,381,830 A * | 1/1995 | Niemann | E03C 1/0401 137/615 |
| 6,757,921 B2 | 7/2004 | Esche | |
| 7,533,683 B2 * | 5/2009 | Ortega | E03C 1/0403 137/15.18 |
| 8,136,552 B2 * | 3/2012 | Carignan | F16K 21/04 137/625.4 |
| 8,375,993 B2 * | 2/2013 | Esche | E03C 1/04 137/801 |
| 8,567,430 B2 * | 10/2013 | Allen | F16K 31/602 137/315.15 |

(Continued)

*Primary Examiner* — Matthew W Jellett
*Assistant Examiner* — Christopher D Ballman
(74) *Attorney, Agent, or Firm* — Alan D. Kamrath; Karin L. Williams PC; Mayer & Williams PC

(57) ABSTRACT

A pull-out faucet contains: a hollow body, a control valve assembly, a water supply pipe set, a water hose, and a spray head. The hollow body has a longitudinal chamber, an accommodation groove, and a first orifice. The control valve assembly includes: a right-angle valve block having multiple inlets, an outlet, and multiple apertures. A positioning element is configured to connect the right-angle valve block so as to accommodate a part of the right-angle valve block in the accommodation groove, a mixing valve is configured to communicate with the multiple apertures, a first cap is configured to position the mixing valve in the accommodation groove, and an operation lever is configured to turn on/off and to control the mixing valve.

7 Claims, 23 Drawing Sheets

(56) References Cited

U.S. PATENT DOCUMENTS

| | | | |
|---|---|---|---|
| 8,584,696 B2* | 11/2013 | Hsu | E03C 1/04 137/315.12 |
| 8,631,816 B2* | 1/2014 | Hsu | E03C 1/04 137/315.12 |
| 8,733,396 B2* | 5/2014 | Huang | F16K 11/0787 137/269 |
| 8,763,175 B2* | 7/2014 | Li | E03C 1/0402 137/359 |
| 8,925,571 B2* | 1/2015 | Li | E03C 1/0402 137/315.12 |
| 8,944,093 B2* | 2/2015 | Veros | E03C 1/04 137/315.13 |
| 9,259,744 B2* | 2/2016 | Hansen | B05B 1/18 |
| 9,624,654 B2* | 4/2017 | Tseng | E03C 1/055 |
| 2006/0076056 A1* | 4/2006 | Schmitt | B01D 61/10 137/216 |
| 2008/0256702 A1* | 10/2008 | Yeh | A47K 5/1205 4/675 |
| 2008/0276367 A1* | 11/2008 | Bares | E03C 1/04 4/677 |
| 2009/0242058 A1* | 10/2009 | Hansen | E03C 1/0403 137/801 |
| 2011/0297248 A1* | 12/2011 | Nelson | E03C 1/04 137/343 |
| 2014/0015244 A1* | 1/2014 | Kronenbitter | F16L 41/02 285/125.1 |
| 2014/0083539 A1* | 3/2014 | Ho | E03C 1/0401 137/625.4 |
| 2014/0124049 A1* | 5/2014 | Ye | E03C 1/0401 137/315.01 |

* cited by examiner

US 10,450,729 B2

PULL-OUT FAUCET

FIELD OF THE INVENTION

The present invention relates to a pull-out faucet, and more particularly to the pull-out faucet which contains a right-angle valve block accommodated in the pull-out faucet from a bottom of a hollow body via a longitudinal chamber.

BACKGROUND OF THE INVENTION

A conventional pull-out faucet is disclosed in U.S. Pat. No. 6,757,921 and contains a right-angle valve block accommodated in a hollow body from an opening. In assembly, the cold-water inlet tube, the hot-water inlet tube, and the mixing outlet tube are in connection with and are inserted through the right-angle valve block from the opening until the right-angle valve block is fixed. The mixing valve is housed in the opening.

However, before the right-angle valve block is fixed, it stocks in the opening and cannot move into the hollow body. Furthermore, the right-angle valve block friction with the opening easily. When the cold-water inlet tube and the hot-water inlet tube are made of metal, they cannot bend and deform, hence water leaks among the cold-water inlet tube, the hot-water inlet tube, and the right-angle valve block.

A size of the right-angle valve block is less than an inner diameter of the opening to reducing using versatility.

The present invention has arisen to mitigate and/or obviate the afore-described disadvantages.

SUMMARY OF THE INVENTION

The primary aspect of the present invention is to provide a pull-out faucet in which the right-angle valve block is accommodated in the accommodation groove easily and to avoid a collision of the right-angle valve block with the casing.

To obtain the above aspect, a pull-out faucet provided by the present invention contains: a hollow body, a control valve assembly mounted on the hollow body, a water supply pipe set communicating with the control valve assembly, a water hose communicating with the water supply pipe set so as to supply water, and a spray head disposed on an outlet segment of the hollow body and communicating with the water hose. The hollow body has a longitudinal chamber, an accommodation groove, and a first orifice defined in the accommodation groove and communicating with the longitudinal chamber.

The control valve assembly includes:

a right-angle valve block having multiple inlets, an outlet, and multiple apertures, each of the multiple inlets and the outlet respectively communicates with each of the multiple apertures; the right-angle valve block is moved into the longitudinal chamber from a bottom of the hollow body, and one end of the right-angle valve block corresponds to the first orifice enters into the accommodation grove via the first orifice;

a positioning configured to connect the right-angle valve block so as to accommodate a part of the right-angle valve block in the accommodation groove;

a mixing valve configured to communicate with the multiple apertures;

a first cap configured to position the mixing valve in the accommodation groove; and an operation lever configured to turn on/off and to control the mixing valve.

DETAILED DESCRIPTION OF THE PREFERRED EMBODIMENTS

Figure 1:
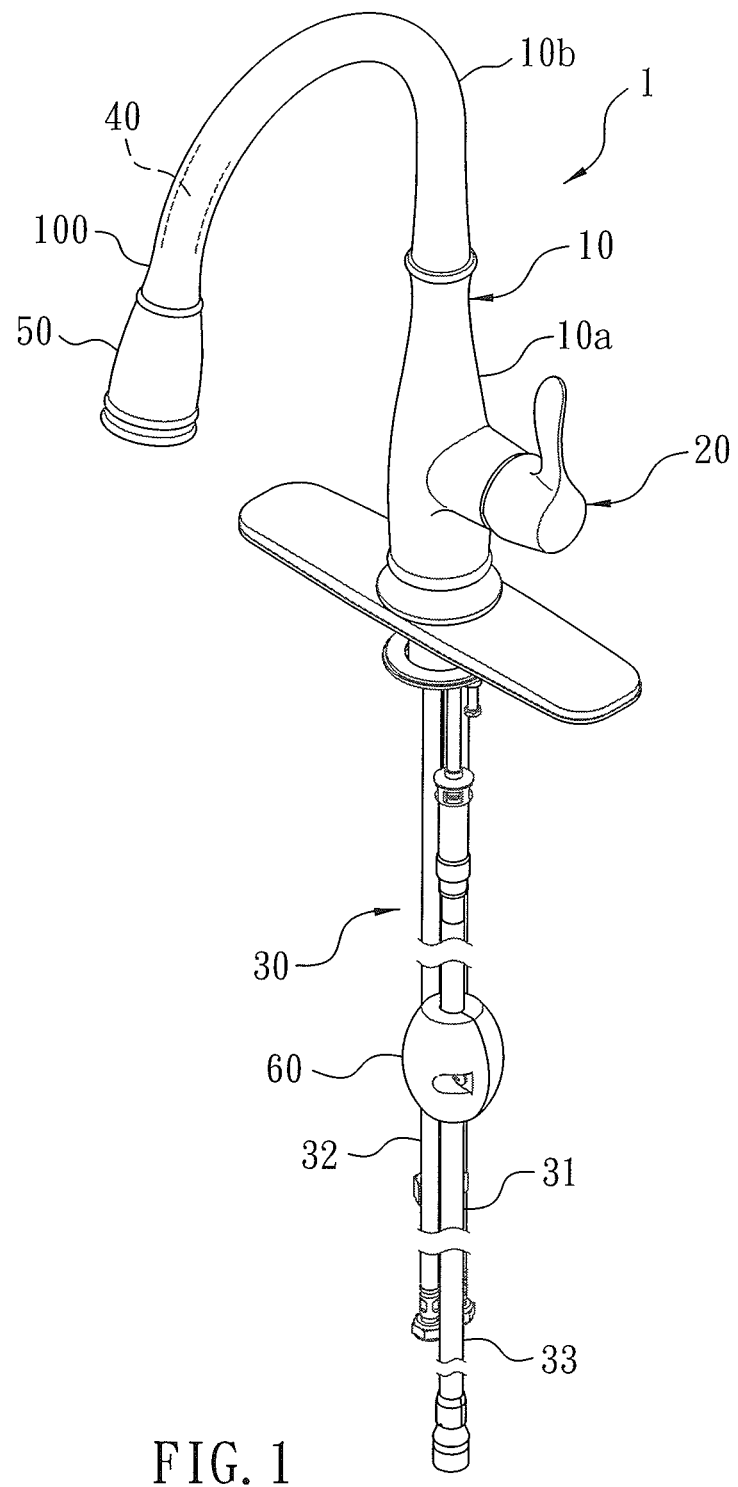
FIG. 1 is a perspective view showing the assembly of a pull-out faucet according to a first embodiment of the present invention.
Figure 2:
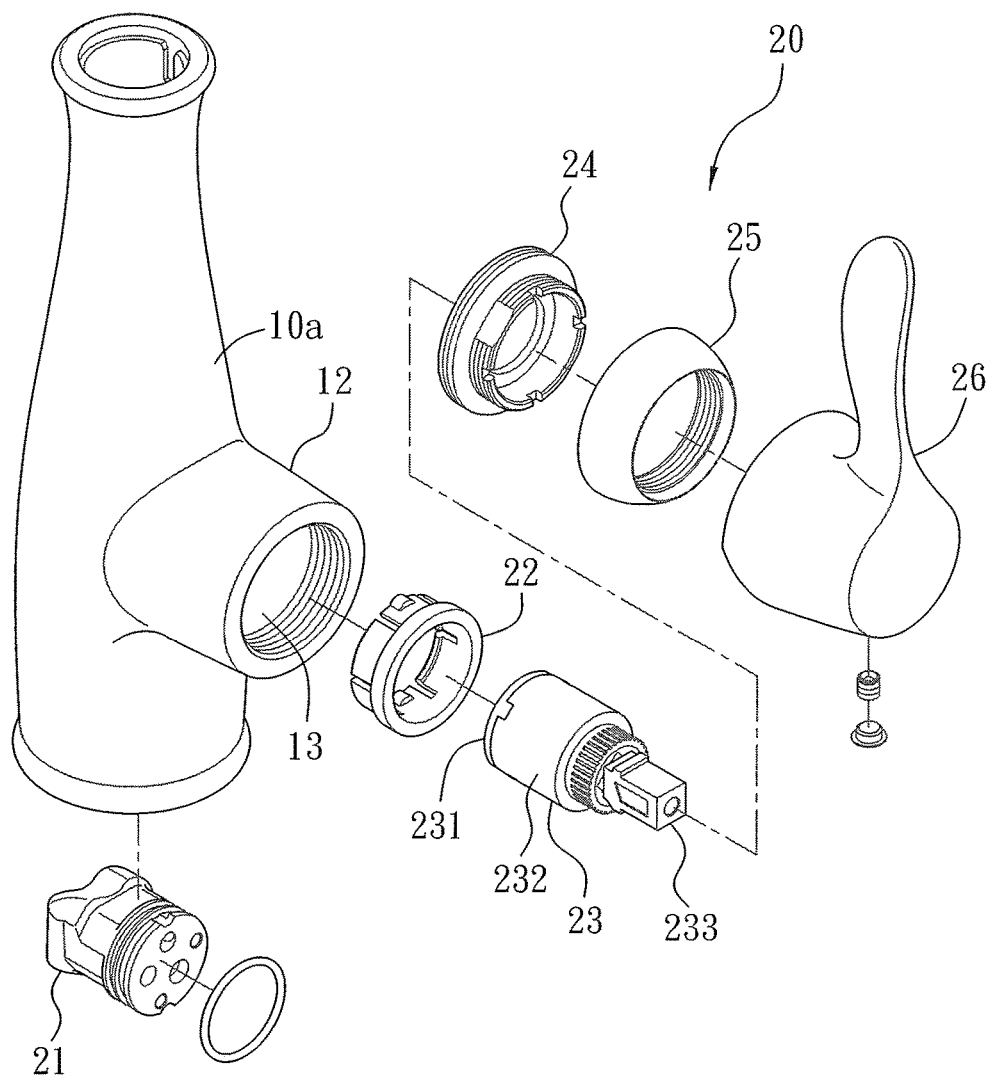
FIG. 2 is a perspective view showing the exploded components of a part of the pull-out faucet according to the first embodiment of the present invention.
Figure 3:
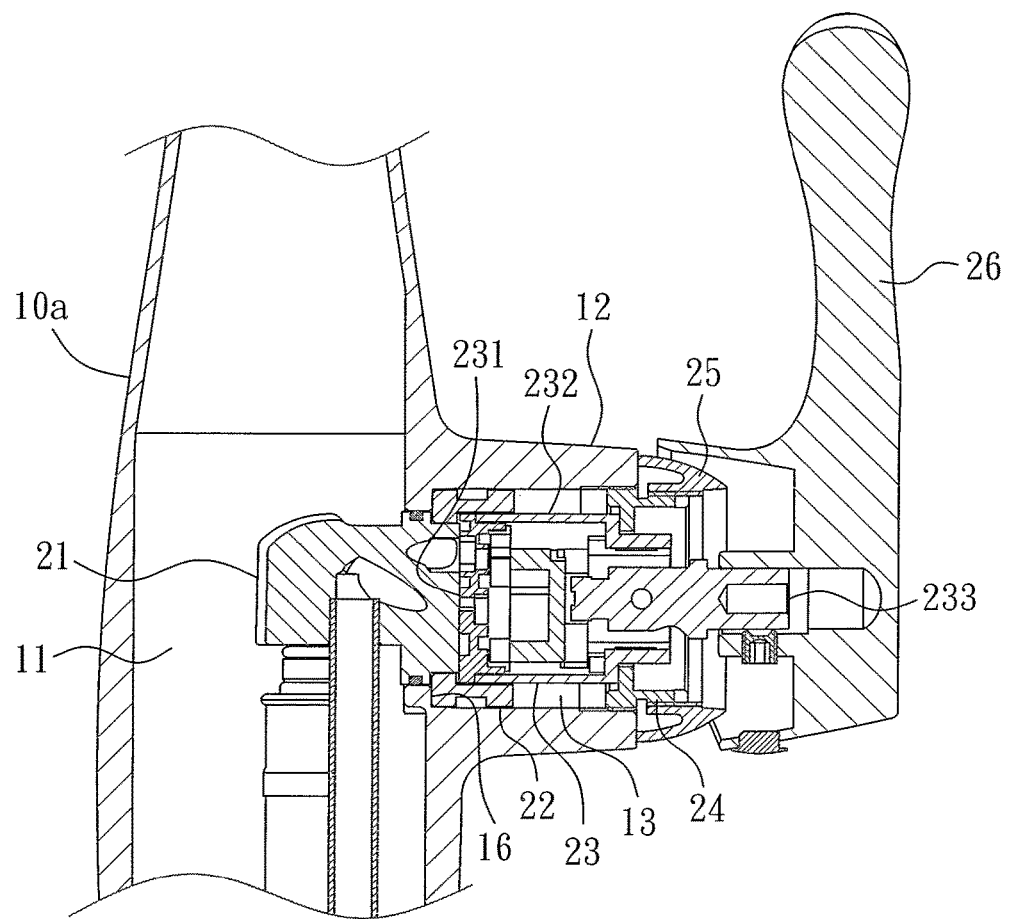
FIG. 3 is a cross sectional view showing the assembly of a part of the pull-out faucet according to the first embodiment of the present invention.

With reference to FIGS. 1-3, a pull-out faucet 1 according to a first embodiment of the present invention comprises: a hollow body 10, a control valve assembly 20 mounted on the hollow body 10, a water supply pipe set 30 communicating with the control valve assembly 20, a water hose 40 communicating with the water supply pipe set 30 so as to supply water, and a spray head 50 disposed on an outlet segment 100 of the hollow body 10 and communicating with the water hose 40.

The water supply pipe set 30 includes a cold-water inflow tube 31, a hot-water inflow tube 32, and a mixing outflow tube 33. After cold water and hot water flow into the control valve assembly 20 from the cold-water inflow tube 31 and the hot-water inflow tube 32 respectively, mixing water of the cold water and the hot water flow to the spray head 50 from the mixing outflow tube 33 via the water hose 40, the spray head 50 is pulled outwardly to spray the mixing water based on using requirements. Thereafter, the spray head 50 automatically returns back to the outlet segment 100 of the hollow body 10 after being released. A counterweight 60 is connected with the water hose 40 so as to provide an automatic returning force.

Figure 4:
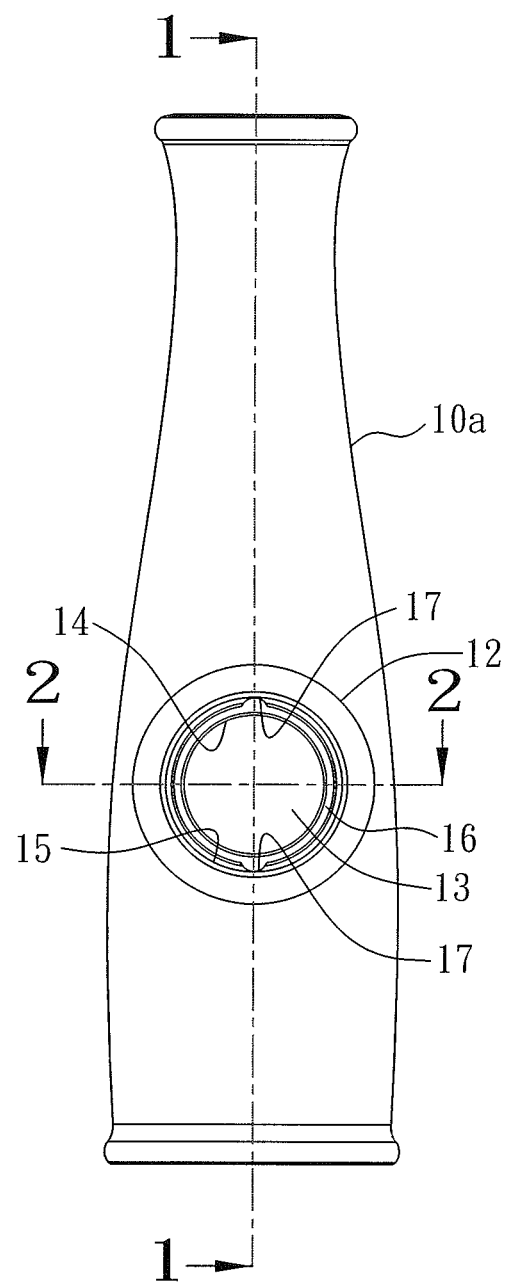
FIG. 4 is a side plan view showing the assembly of a part of the pull-out faucet according to the first embodiment of the present invention.
Figure 5:
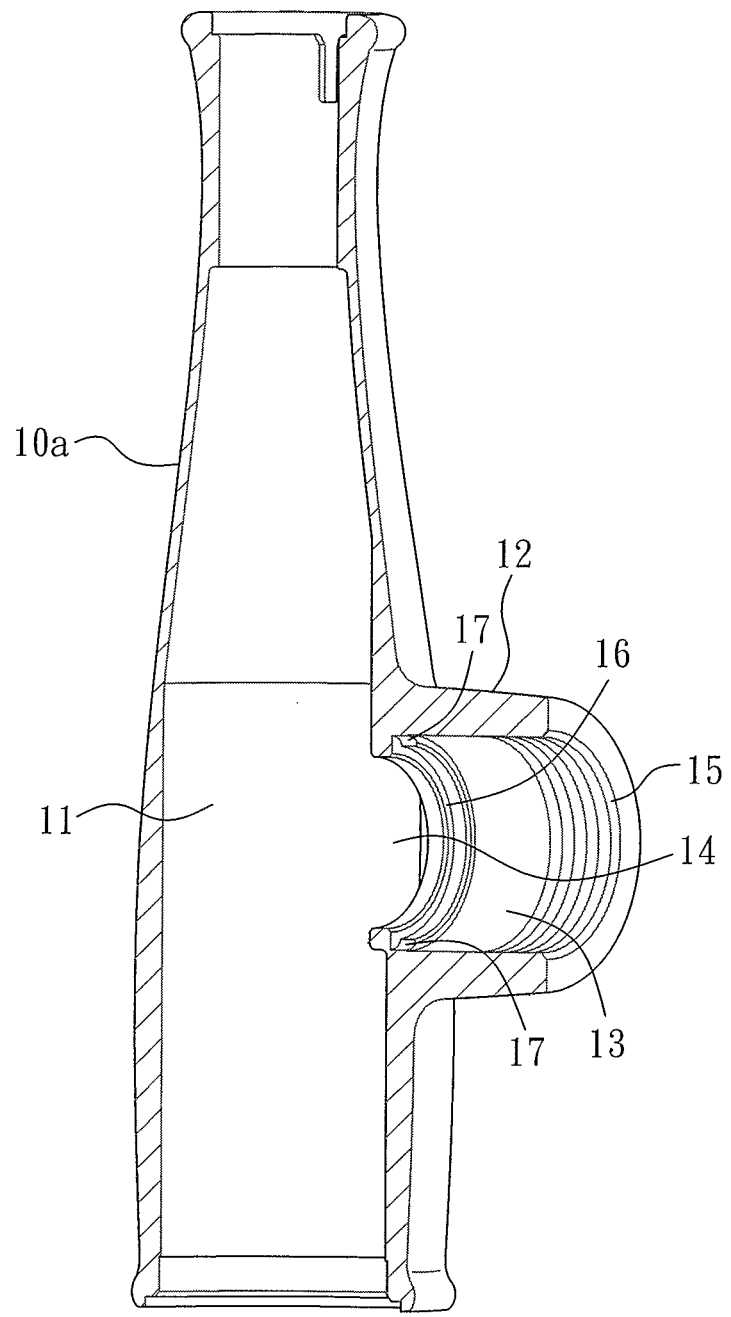
FIG. 5 is a cross sectional view taken along the line 1-1 of FIG. 4.
Figure 6:
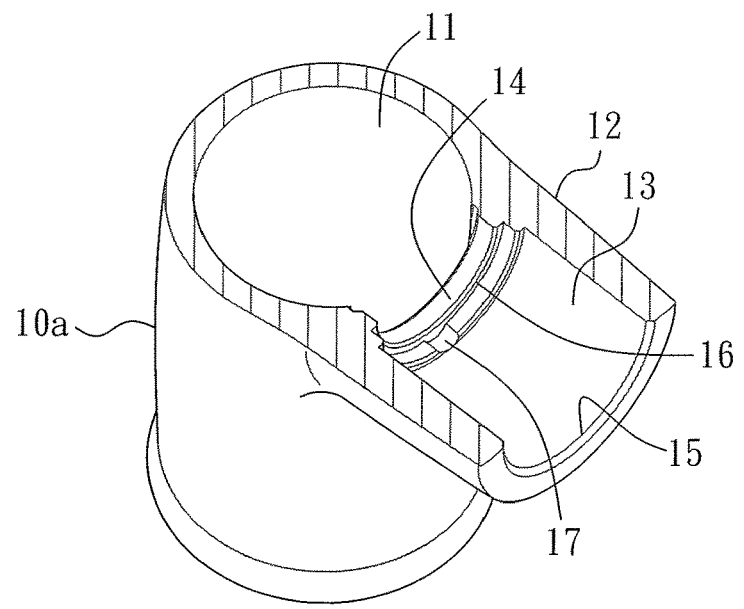
FIG. 6 is a cross sectional view taken along the line 2-2 of FIG. 4.

Referring to FIGS. 1 and 3, the hollow body 10 includes a casing 10a and a bent tube 10b extending outwardly from a top of the casing 10a, wherein the casing 10a has a longitudinal chamber 11 defined therein, a seat portion 12 horizontally extending outward from the casing 10a, an accommodation groove 13 formed in the seat portion 12, a first orifice 14 defined in the accommodation groove 13 and communicating with the longitudinal chamber 11, as shown in FIGS. 4-6. The accommodation groove 13 has a first peripheral rib 16 formed around the first orifice 14, at least one first fixing hole 17 adjacent to the first peripheral rib 16, and a second orifice 15 formed on an outer end of the accommodation groove 13. In this embodiment, two first fixing holes 17 are symmetrically formed adjacent to the first peripheral rib 16 and are arcuate.

As shown in FIGS. 1 and 2, the control valve assembly 20 includes a right-angle valve block 21, a positioning element 22, a mixing valve 23, a first cap 24, a second cap 25, and an operation lever 26.

Figure 7:
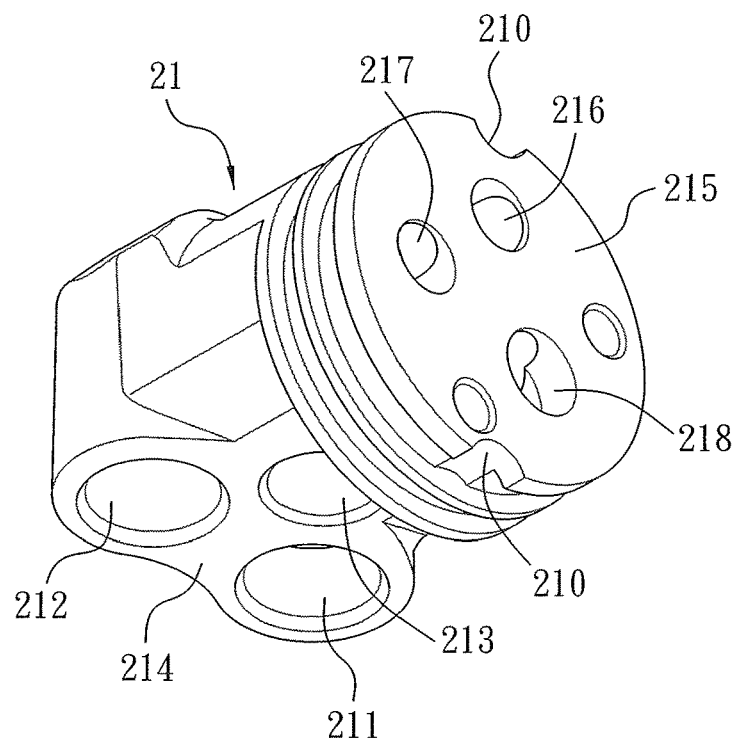
FIG. 7 is a perspective view showing the assembly of a part of the pull-out faucet according to the first embodiment of the present invention.
Figure 8:
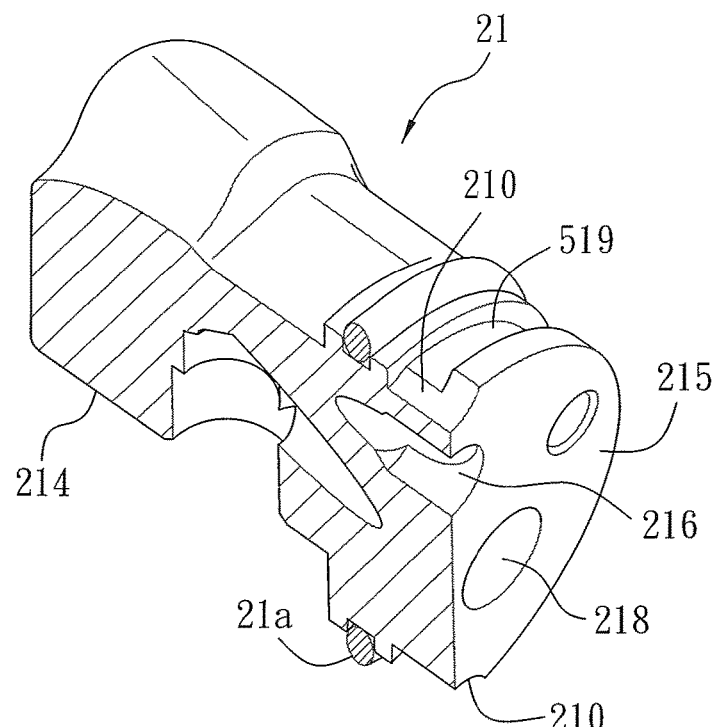
FIG. 8 is a cross sectional view showing the assembly of a part of the pull-out faucet according to the first embodiment of the present invention.

As illustrated in FIGS. 7 and 8, the right-angle valve block 21 has a first inlet 211 configured to flow the cold water, a second inlet 212 configured to flow the hot water, and an outlet 213 configured to flow the mixing water. The first inlet 211, the second inlet 212, and the outlet 213 are arranged on a first bottom face 214 of the right-angle valve block 21, wherein the right-angle valve block 21 has a peripheral face 215 on which a first aperture 216, a second aperture 217, and a third aperture 218 are arranged, and the first aperture 216 communicates with the first inlet 211, the second aperture 217 is in communication with the second inlet 212, and the third aperture 218 communicates with the outlet 213. The right-angle valve block 21 further has a locking slot 219 proximate to the peripheral face 215, and the right-angle valve block 21 has at least one second fixing hole 210 extending to the peripheral face 215 via the locking slot 219. In this embodiment, two second fixing orifices 210 are symmetrically formed in an arc shape.

Figure 9:
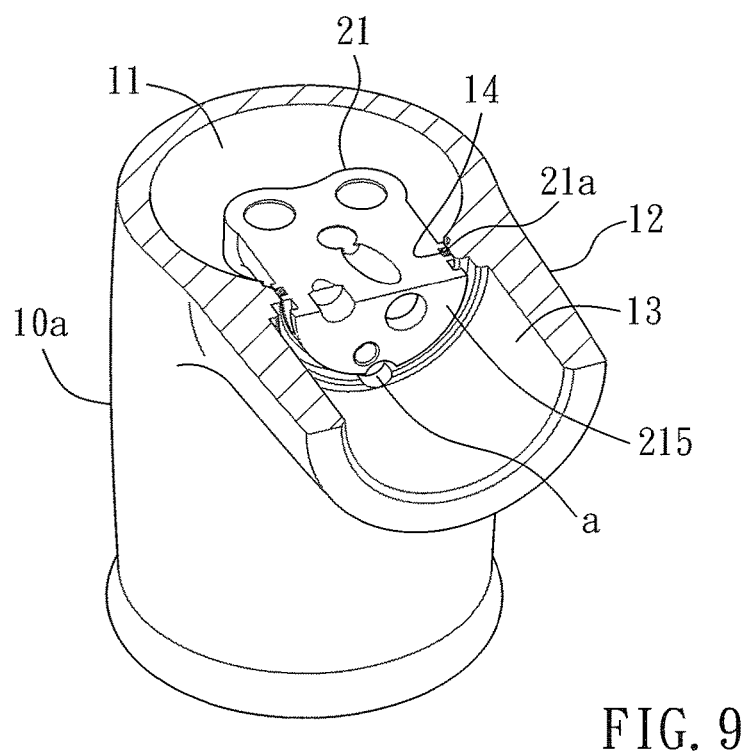
FIG. 9 is a cross sectional view showing the operation of a part of the pull-out faucet according to the first embodiment of the present invention.
Figure 10:
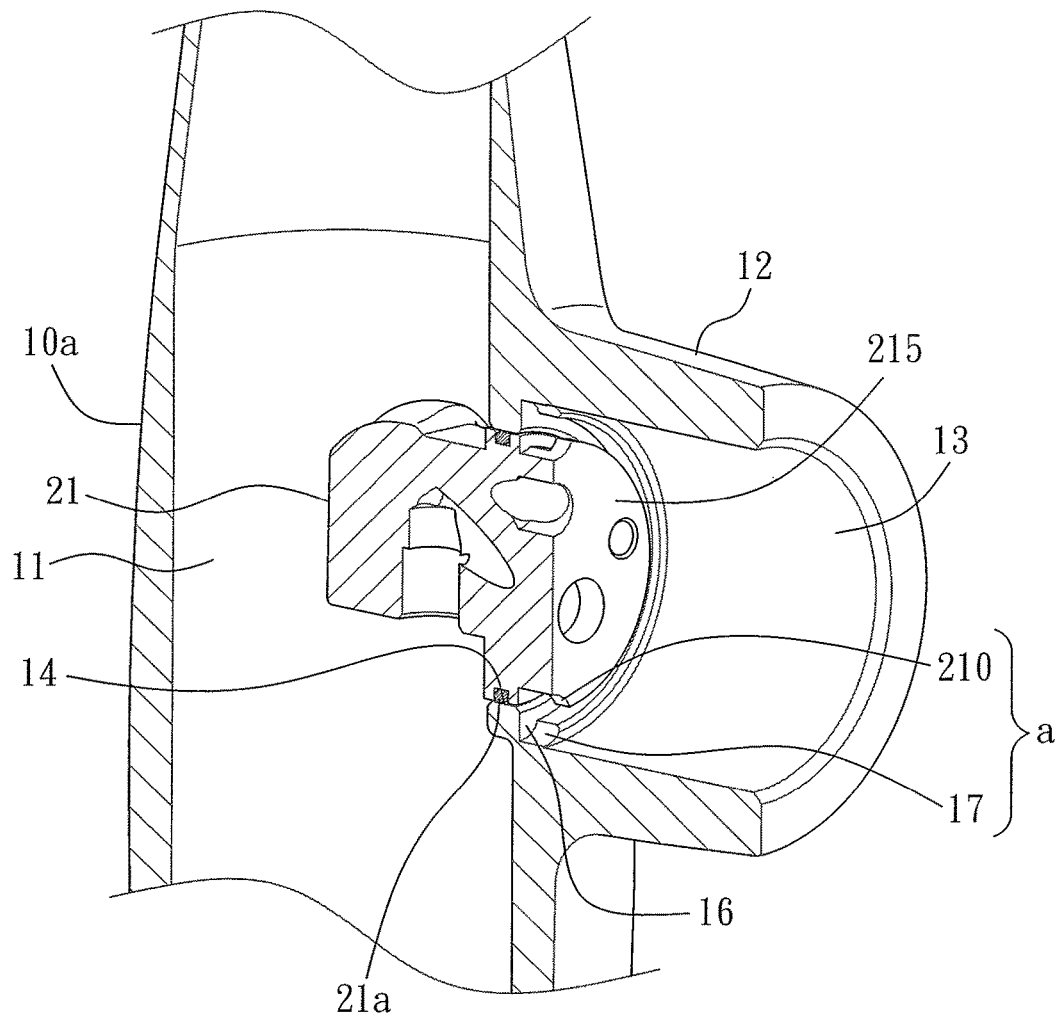
FIG. 10 is another cross sectional view showing the operation of a part of the pull-out faucet according to the first embodiment of the present invention.

The right-angle valve block 21 has a sealing washer 21a retained in an outer wall thereof, as shown in FIGS. 8 and 9, when the right-angle valve block 21 is accommodated in the longitudinal chamber 11 of the casing 10a, the peripheral face 215 is opposite to the accommodation groove 13. Thereafter, the peripheral face 215 of the right-angle valve block 21 is housed in the accommodation groove 13 via the first orifice 14 so that the sealing washer 21a closes the first orifice 14, and the two second fixing holes 210 are individually opposite to the two first fixing orifices 17. As illustrated in FIGS. 9 and 10, between each of the two first fixing orifices 17 and each of the two second fixing orifices 210 is defined a limitation orifice a.

Figure 11:
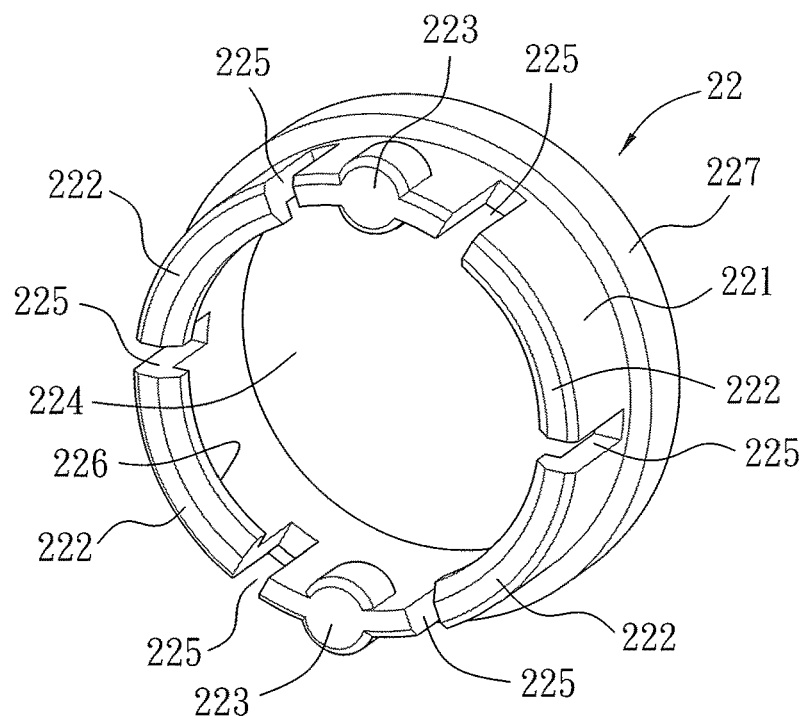
FIG. 11 is a perspective view showing the assembly of a part of the pull-out faucet according to the first embodiment of the present invention.
Figure 12:
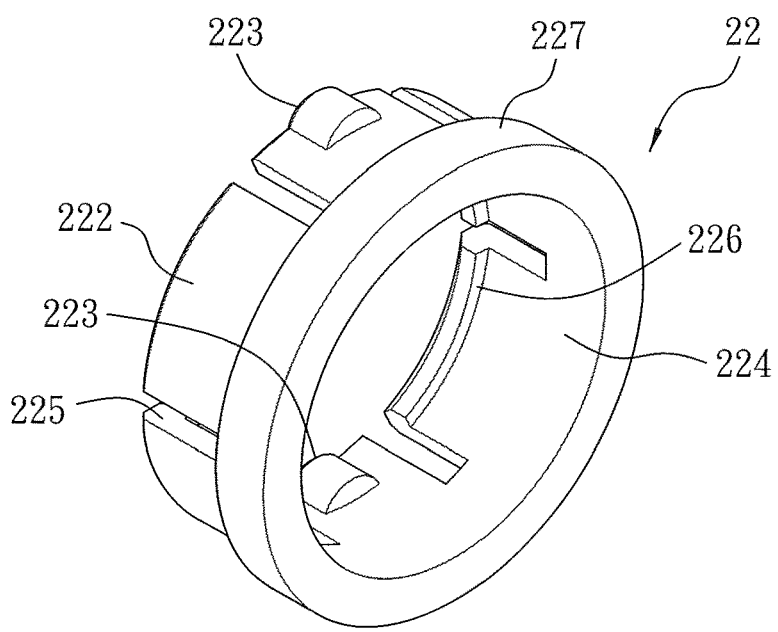
FIG. 12 is another perspective view showing the assembly of a part of the pull-out faucet according to the first embodiment of the present invention.
Figure 13:
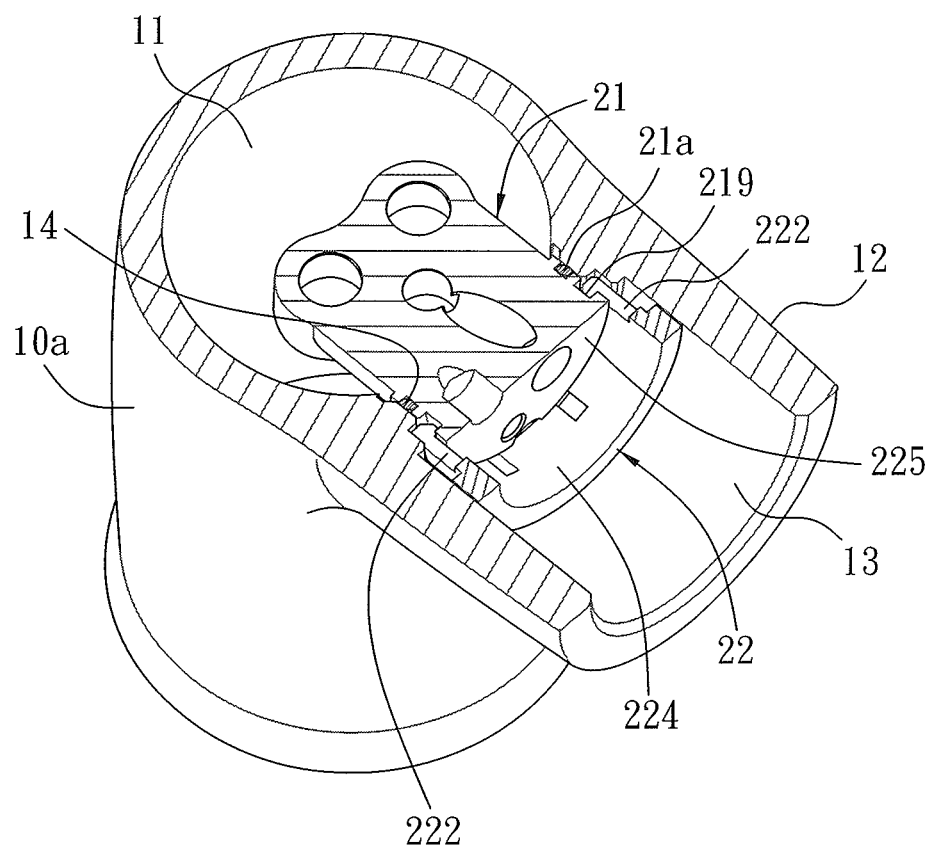
FIG. 13 is a cross sectional view showing the assembly of a part of the pull-out faucet according to the first embodiment of the present invention.
Figure 14:
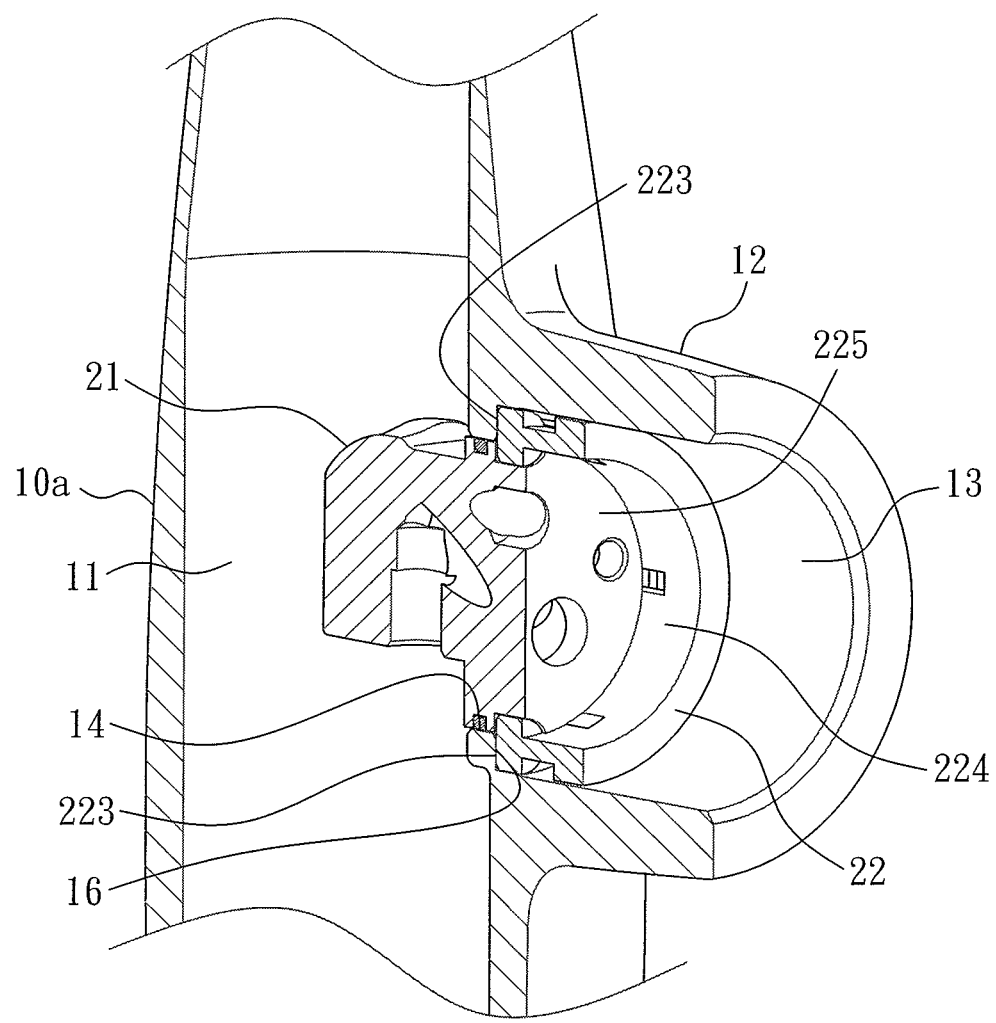
FIG. 14 is another cross sectional view showing the assembly of a part of the pull-out faucet according to the first embodiment of the present invention.

With reference to FIGS. 11 and 12, the positioning element 22 is a circular ring and has a first surround fence 221, at least one extension 222 and at least one column 223 which are separately arranged on the first surround fence 221. In this embodiment, four extensions 222 and two columns 223 are separately arranged on the first surround fence 221, and the first surround fence 221 defines a fitting hole 224 for fitting with the right-angle valve block 21. Referring to FIG. 13, the four extensions 222 flexibly expand and retract so as to retain with the locking slot 219, and the two columns 223 abut against the first peripheral rib 16 in the accommodation groove 13 so as to stop a removal of the right-angle valve block 21 from the first orifice 14. The two columns 223 retain in the limitation orifice a so as to limit a rotation of the right-angle valve block 21. A recess 225 is defined between any two adjacent extensions 222 so that the two adjacent extensions 222 flexibly expand and retract, and each extension 222 has a hook 226 formed on an inner wall thereof so as to hook with the locking slot 219. The first surround fence 221 of the positioning element 22 has a second peripheral rib 227, wherein the second peripheral rib 227 and the two columns 223 fit with the accommodation groove 13 so that each of the two columns 223 retains in the limitation orifice a, and each extension 222 engages with the locking slot 219 of the right-angle valve block 21.

As shown in FIGS. 2 and 3, the mixing valve 23 is housed in the accommodation groove 13, and a second bottom face 231 of the mixing valve 23 contacts with the peripheral face 215 of the right-angle valve block 21, a second surround fence 232 fits in the fitting hole 224 of the positioning element 22 so that the cold water and the hot water flow into the mixing valve 23 at a predetermined ratio from the first aperture 216 and the second aperture 217 respectively so as to produce the mixing water which flows into the third aperture 218 from the right-angle valve block 21. The mixing valve 23 has a rotary shaft 233. Due to the mixing valve 23 and the right-angle valve block 21 are well-known art, further remakes are omitted.

The first cap 24 is screwed with the accommodation groove 13 so as to abut the mixing valve 23 against the accommodation groove 13.

The second cap 25 is screwed with the first cap 24 and abuts against the seat portion 12 so as to embellish the first cap 24.

The operation lever 26 is connected with the rotary shaft 233 of the mixing valve 23, hence the operation lever 26 drives the rotary shaft 233 to control water flow and to adjust water temperature. Due to the first cap 24, the second cap 25, and the operation lever 26 are well-known art, further remarks are omitted.

In assembly, the cold-water inflow tube 31, the hot-water inflow tube 32, and the mixing outflow tube 33 are accommodated in the first inlet 211, the second inlet 212, and the outlet 213 of the first bottom face 214 of the right-angle valve block 21 respectively, and the sealing washer 21a is retained in the outer wall of the right-angle valve block 21, then the right-angle valve block 21 is housed in the longitudinal chamber 11 from a bottom of the casing 10a and is moved to the accommodation groove 13, such that the sealing washer 21a slightly passes through the first orifice 14, and the right-angle valve block 21 is adjusted so that each second fixing orifice 210 aligns with each first fixing orifice 17, thus forming the limitation orifice a. Thereafter, the positioning element 22 is slidably fitted into the accommodation groove 13 from the second orifice 15 by way of the second peripheral rib 227 and each column 223, and the positioning element 22 is adjustably rotated so that each column 223 retains in the limitation orifice a, each extension 222 engages with the locking slot 219 of the right-angle valve block 21. The positioning element 22 and the right-angle valve block 21 are pushed backward until each column 223 of the positioning element 22 contacts with the first peripheral rib 16 in the accommodation groove 13, and the sealing washer 21a of the right-angle valve block 21 abuts against the first orifice 14, thus assembling the right-angle valve block 21 easily and quickly. Then, the mixing valve 23, the first cap 24, the second cap 25, and the operation lever 26 are connected together.

Accordingly, a size of the longitudinal chamber 11 increases so as to accommodate the right-angle valve block 21 in the accommodation groove 13 easily and to avoid a collision of the right-angle valve block 21 with the casing 10a.

Figure 15:
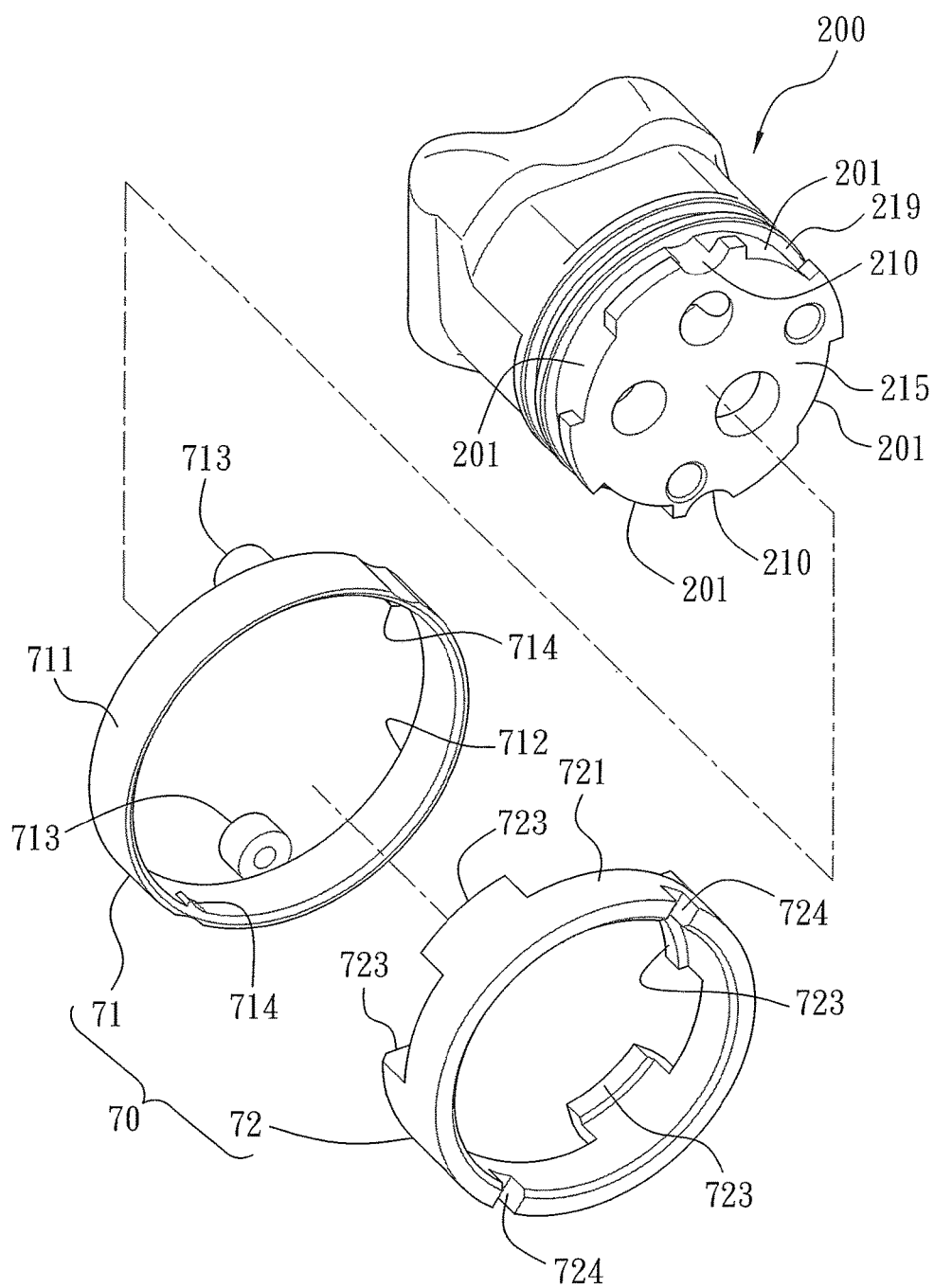
FIG. 15 is a perspective view showing the exploded components of a part of the pull-out faucet according to a second embodiment of the present invention.
Figure 16:
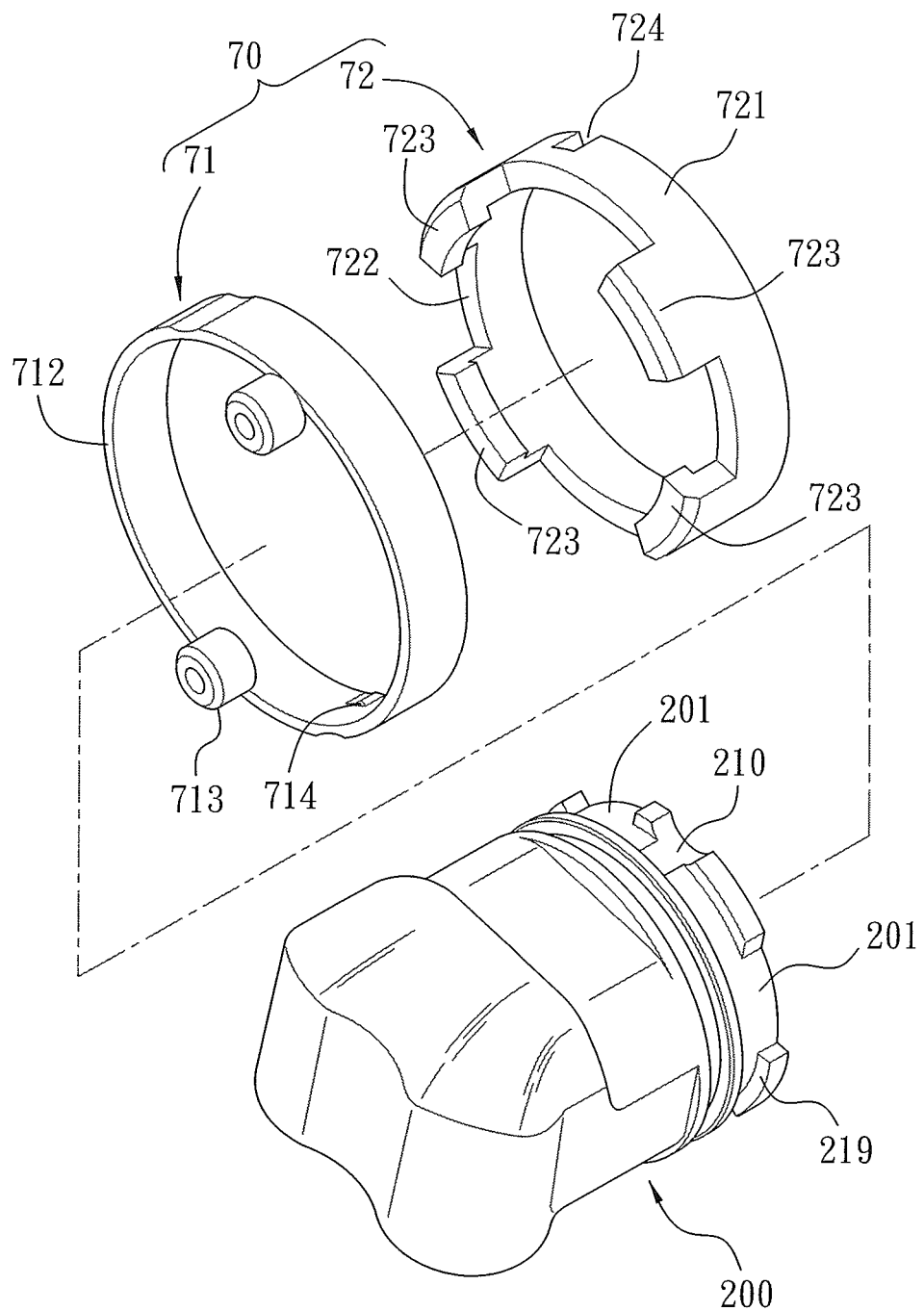
FIG. 16 is another perspective view showing the exploded components of a part of the pull-out faucet according to the second embodiment of the present invention.

With reference to FIGS. 15 and 16, a difference of a pull-out faucet 1 of a second embodiment from that of the first embodiment comprises: at least one trench 201 extending from the locking slot 219 and located adjacent to the peripheral face 215 of the right-angle valve block 200. In this embodiment, four trenches 201 extend from the locking slot 219 and are located adjacent to the peripheral face 215 of the right-angle valve block 200.

The pull-out faucet 1 of the second embodiment comprises: a positioning element 70 including a first affix ring 71 and a second affix ring 72.

The first affix ring 71 has a first main part 711 and at least one column 713 extending inward from a first internal fringe 712 of the first main part 711, wherein an outer diameter of a connection of the at least one column 713 is equal to an outer diameter of the first main part 711, and an inner diameter of the connection of the at least one column 713 is less than an inner diameter of the first main part 711. In this embodiment, two columns 713 symmetrically extend inward from the first internal fringe 712 of the first main part 711, and each of the two columns 713 is retained in each second fixing orifice 210 of the right-angle valve block 200 and the limitation orifice a of each first fixing orifice 17 so as to limit the rotation of the right-angle valve block 200. The first main part 711 of the first affix ring 71 has at least one mounting projection 714 extending from an inner wall of the first main part 711. In this embodiment, two mounting projections 714 symmetrically extend inward from the inner wall of the first main part 711, and each of the two mounting projections 714 is a ratchet.

Figure 17:
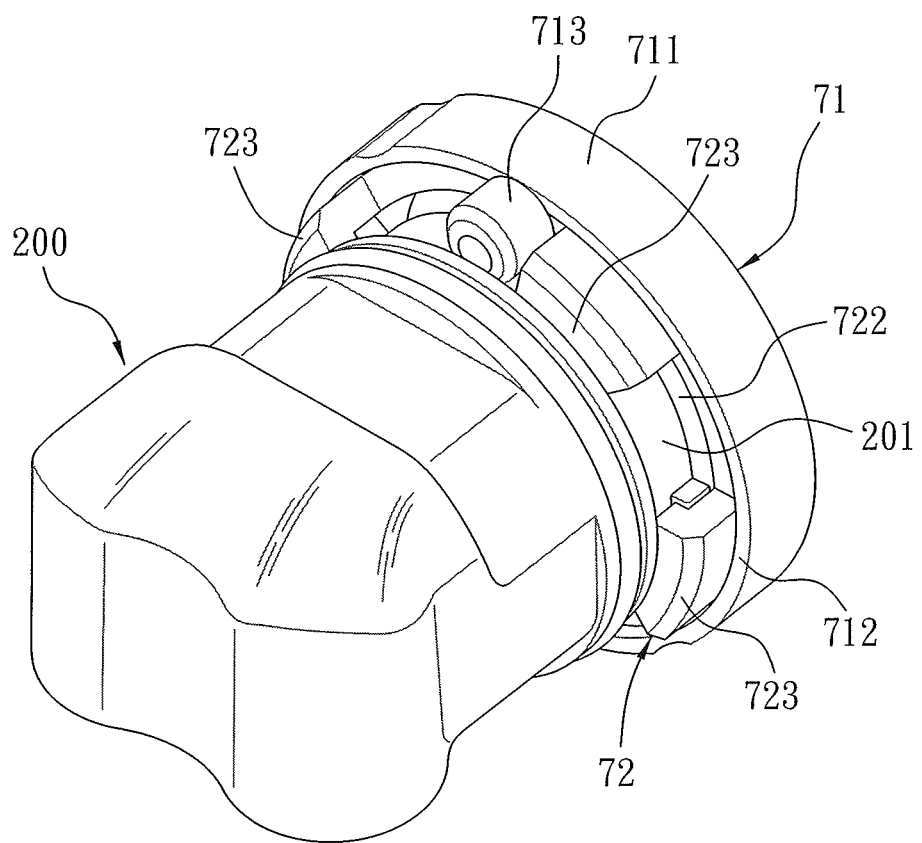
FIG. 17 is a perspective view showing the assembly of a part of the pull-out faucet according to the second embodiment of the present invention.
Figure 18:
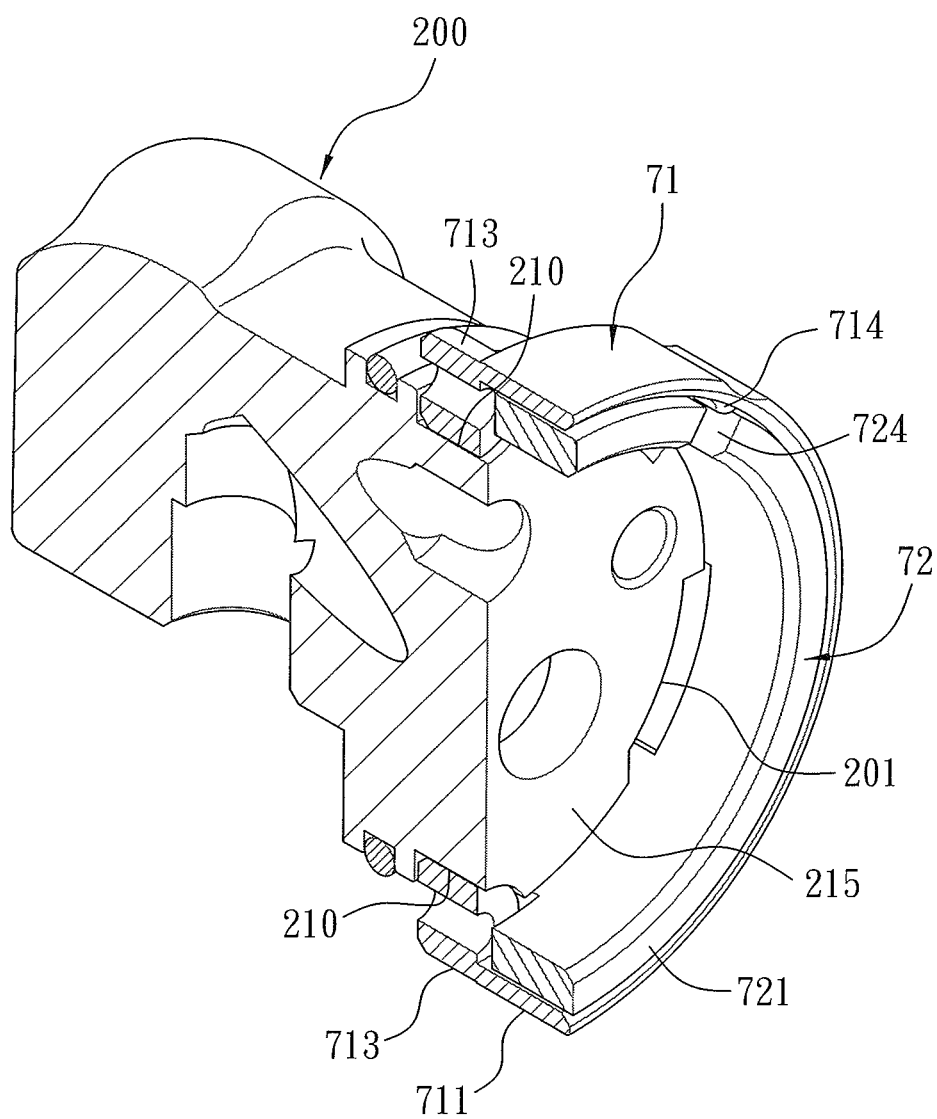
FIG. 18 is a cross sectional view showing the assembly of a part of the pull-out faucet according to the second embodiment of the present invention.
Figure 19:
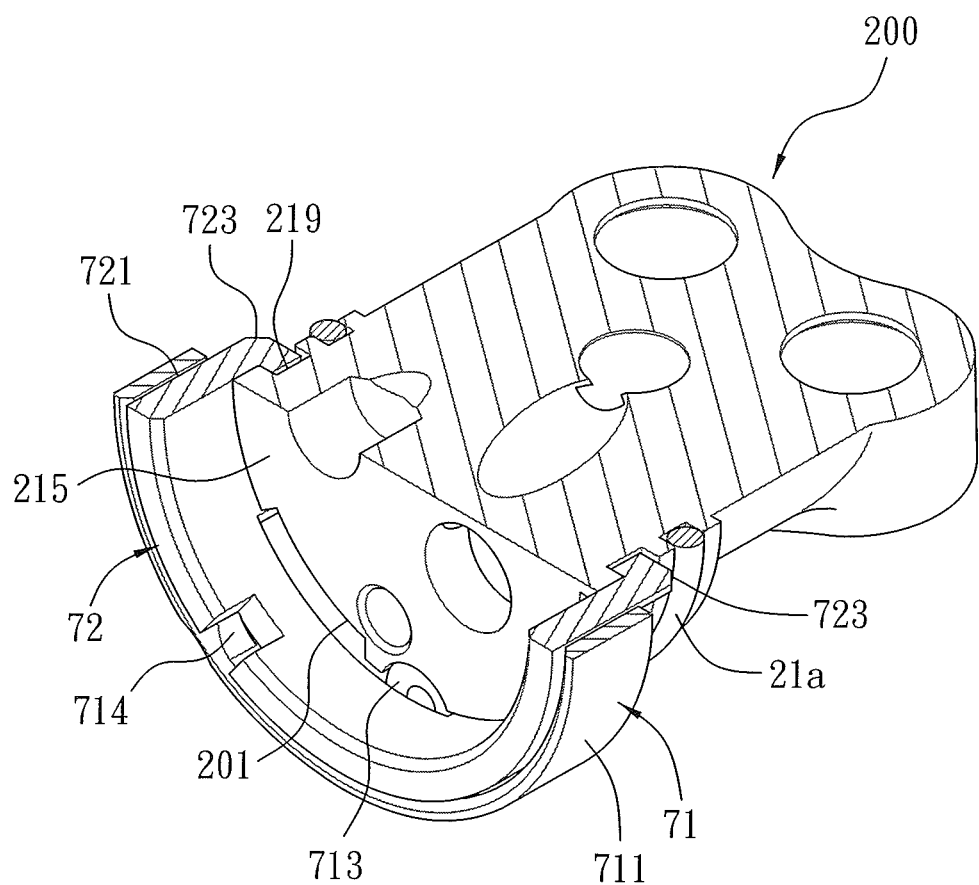
FIG. 19 is another cross sectional view showing the assembly of a part of the pull-out faucet according to the second embodiment of the present invention.

The second affix ring 72 has a second main part 721 and at least one crook 723 extending inward from a second internal fringe 722 of the second main part 721. In this embodiment, four crooks 723 extend inward from the second internal fringe 722 of the second main part 721, and the second main part 721 has at least one securing notch 724. In this embodiment, two symmetrical securing notches 724 are arranged on the second main part 721. Referring to FIGS. 17-19, when slidably fitting the first main part 721 from the first main part 711 of the first affix ring 71, the four crooks 723 are retained into the four trenches 201 of the right-angle valve block 200 respectively, and the second affix ring 72 is revolved. For example, the second affix ring 72 is clockwise revolved 36 degrees relative to the peripheral face 215 of the right-angle valve block 200 until the four crooks 723 are stopped by the two columns 713 individually and are fixed in the locking slot 219. After rotating the second affix ring 72, each mounting projection 714 slides into and engages with each of the two symmetrical securing notches 724 so as to limit the rotation of the second affix ring 72, and a part of the right-angle valve block 200 is housed in the accommodation groove 13 securely.

As fixing the mixing valve 23, the peripheral face 215 of the right-angle valve block 200 contacts with the mixing valve 23 so as to force each of the four crooks 723 of the second affix ring 72 to abut against the first peripheral rib 16 in the accommodation groove 13, then the first cap 24, the second cap 25, and the operation lever 26 are connected together.

After rotating the second affix ring 72, each crook 723 contacts with each column 713, and each mounting projection 714 engages with each securing notch 724 so as to fix the right-angle valve block 200 in the accommodation groove 13 securely.

Figure 20:
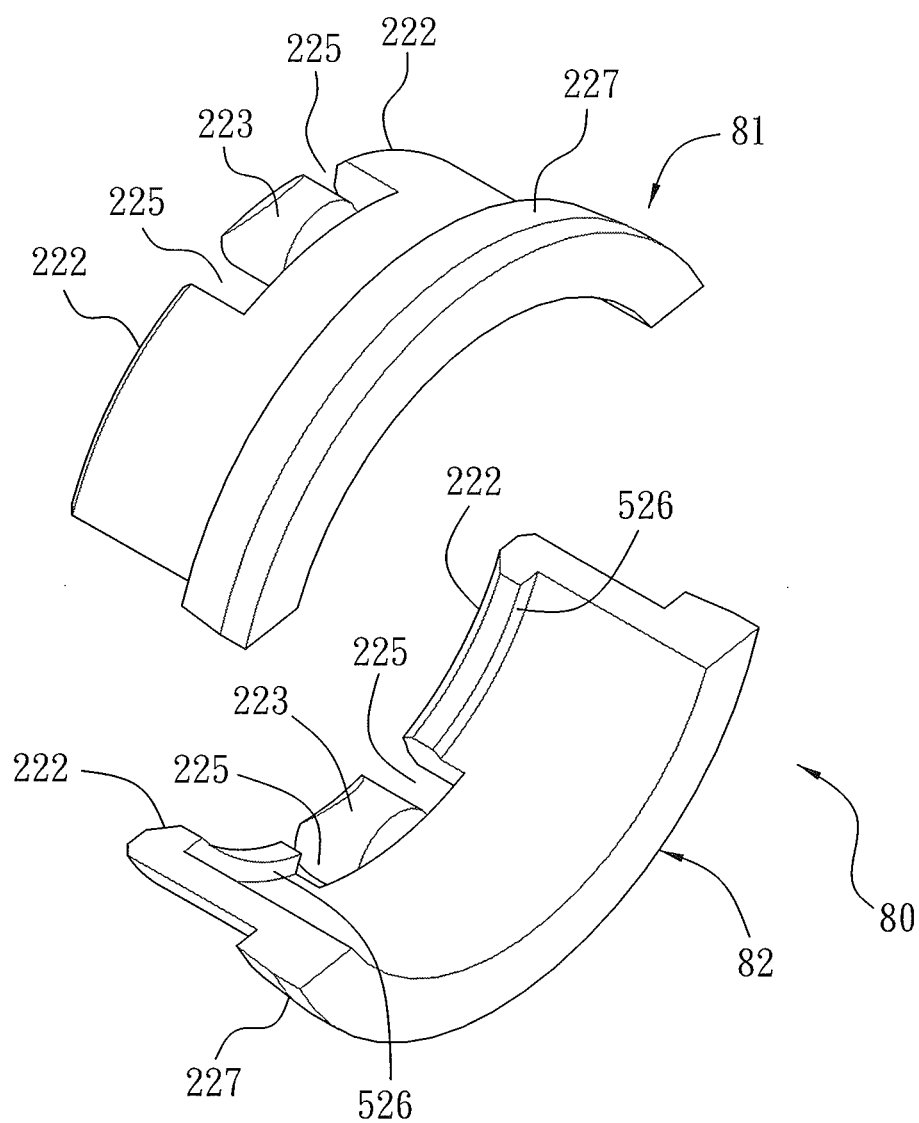
FIG. 20 is a perspective view showing the exploded components of a part of the pull-out faucet according to a third embodiment of the present invention.

With reference to FIG. 20, a difference of a pull-out faucet of a third embodiment from that of the first embodiment comprises: a positioning element 80 including a third affix ring 81 and a fourth affix ring 82 which are semicircular, wherein each of the third affix ring 81 and the fourth affix ring 82 has two extensions 222 between which a column 223 is defined, and among the two extensions 222 and the column 223 is defined a recess 225.

Thereby, a size of the third affix ring 81 and the fourth affix ring 82 is less than the positioning element 22 of the first embodiment so as to reduce material cost and to facilitate rotation of the third affix ring 81 and the fourth affix ring 82 in the accommodation groove 13.

Figure 21:
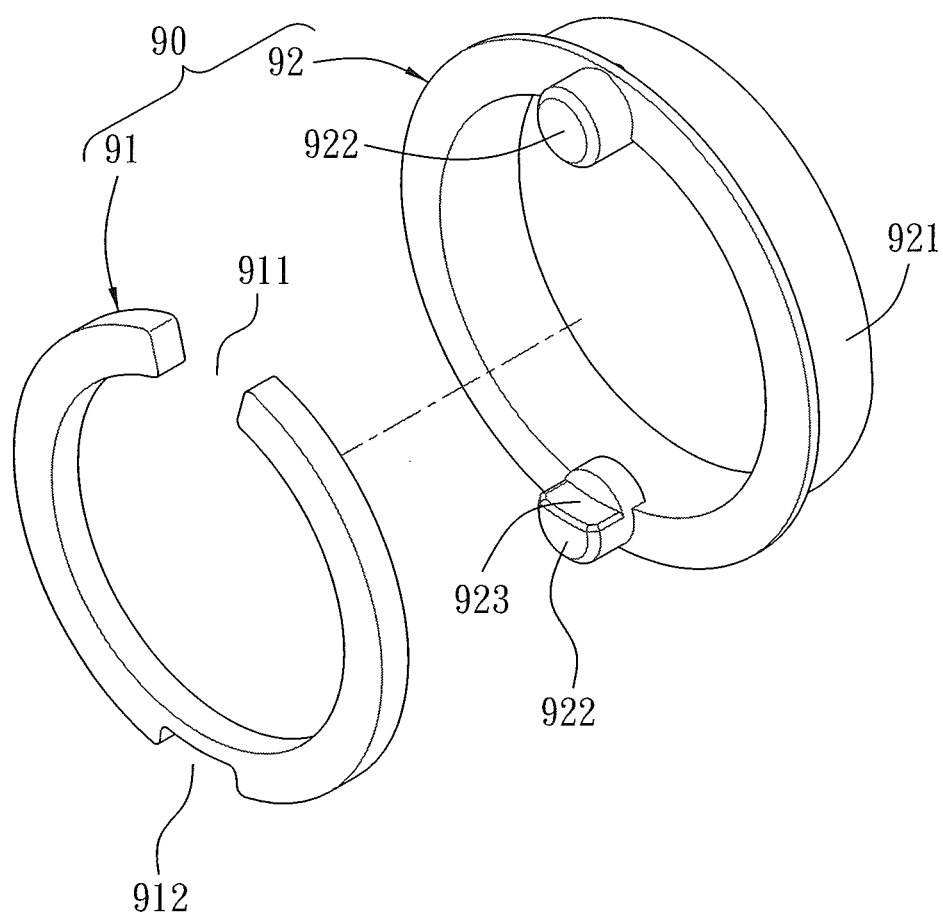
FIG. 21 is a perspective view showing the exploded components of a part of the pull-out faucet according to a fourth embodiment of the present invention.
Figure 22:
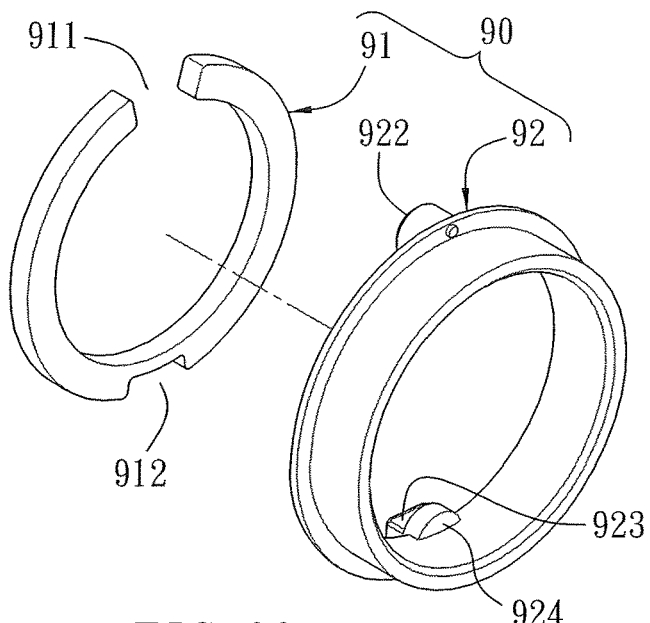
FIG. 22 is another perspective view showing the exploded components of a part of the pull-out faucet according to the fourth embodiment of the present invention.
Figure 23:
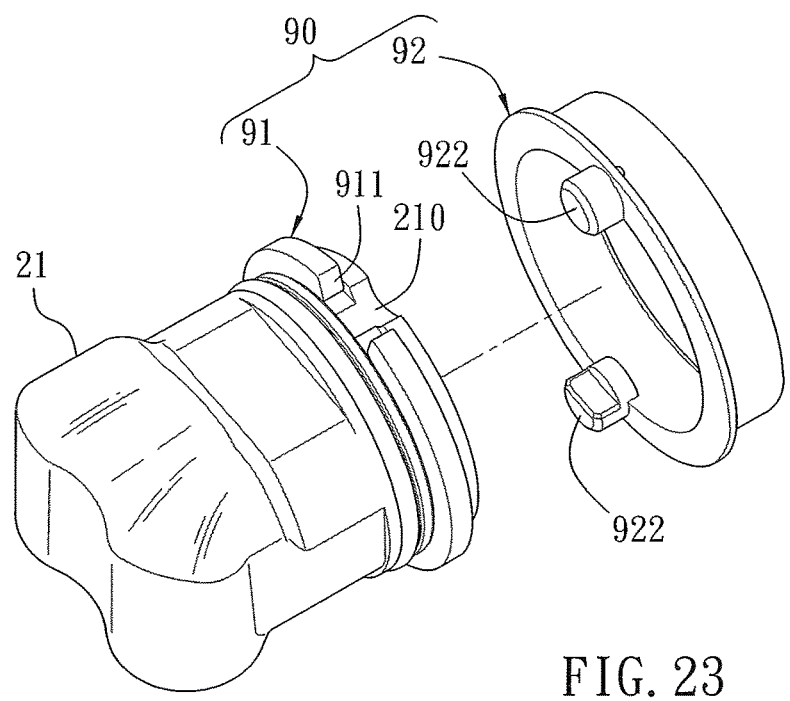
FIG. 23 is a perspective view showing the operation of a part of the pull-out faucet according to the fourth embodiment of the present invention.
Figure 24:
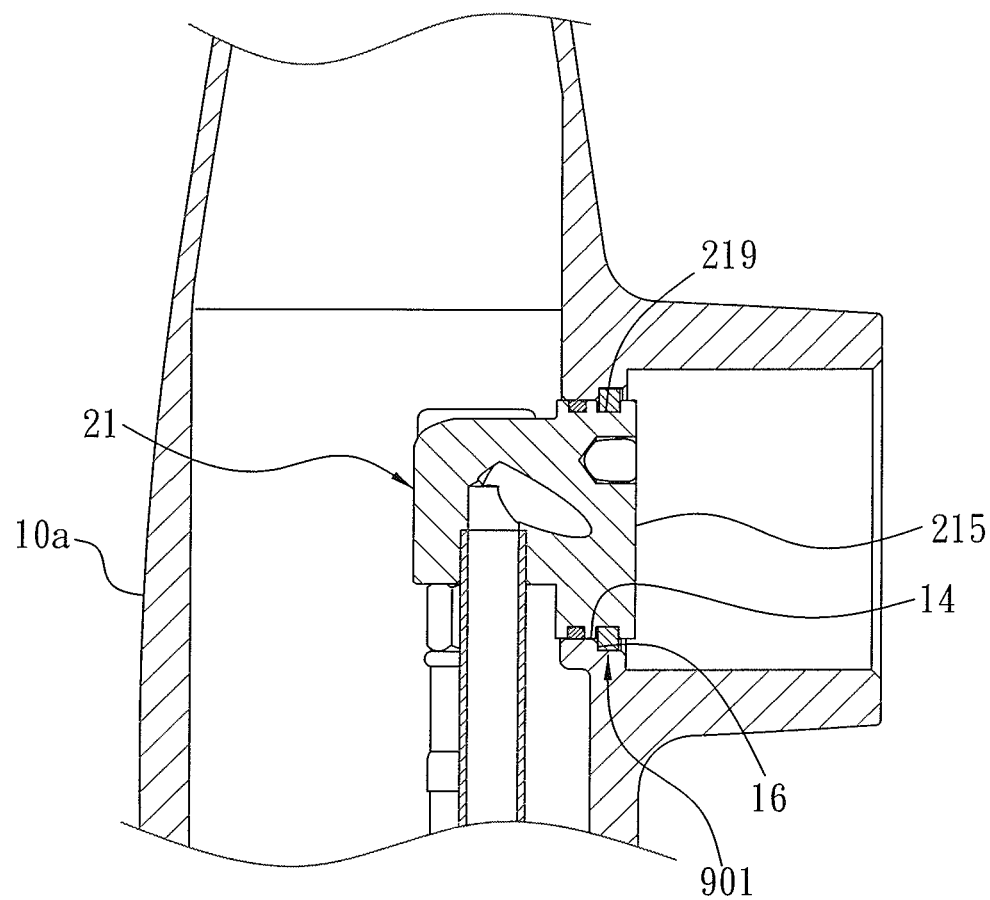
FIG. 24 is a cross sectional view showing the operation of a part of the pull-out faucet according to a fifth embodiment of the present invention.
Figure 25:
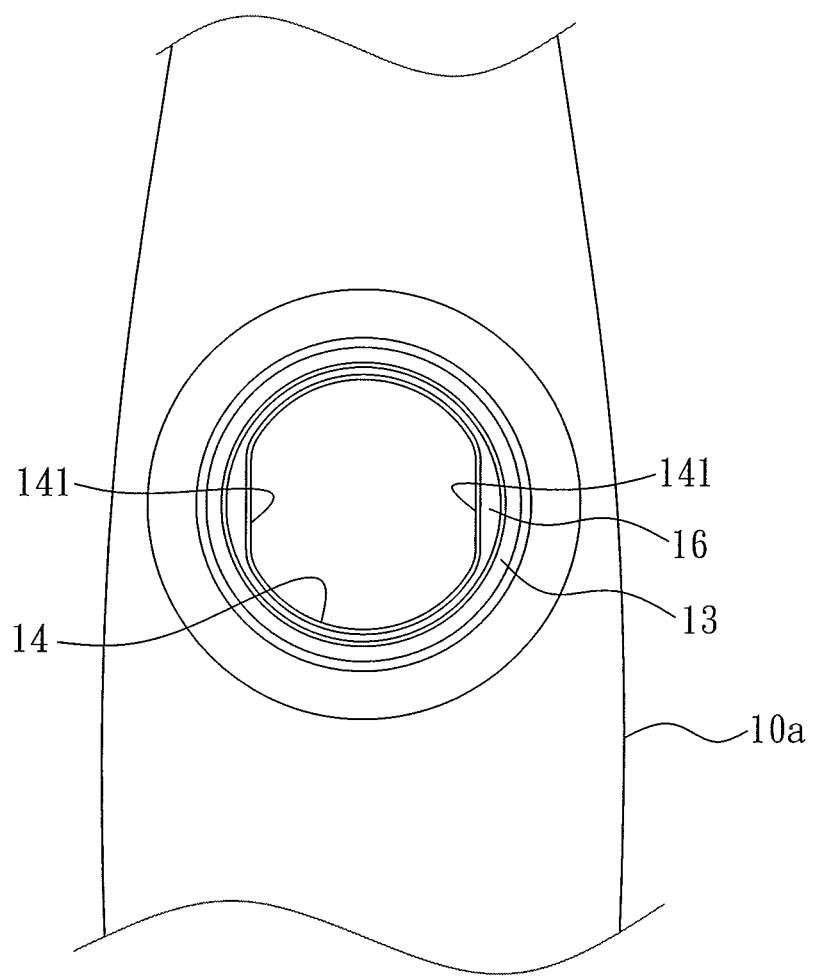
FIG. 25 is a side plan view showing the operation of a part of the pull-out faucet according to the fifth embodiment of the present invention.
Figure 26:
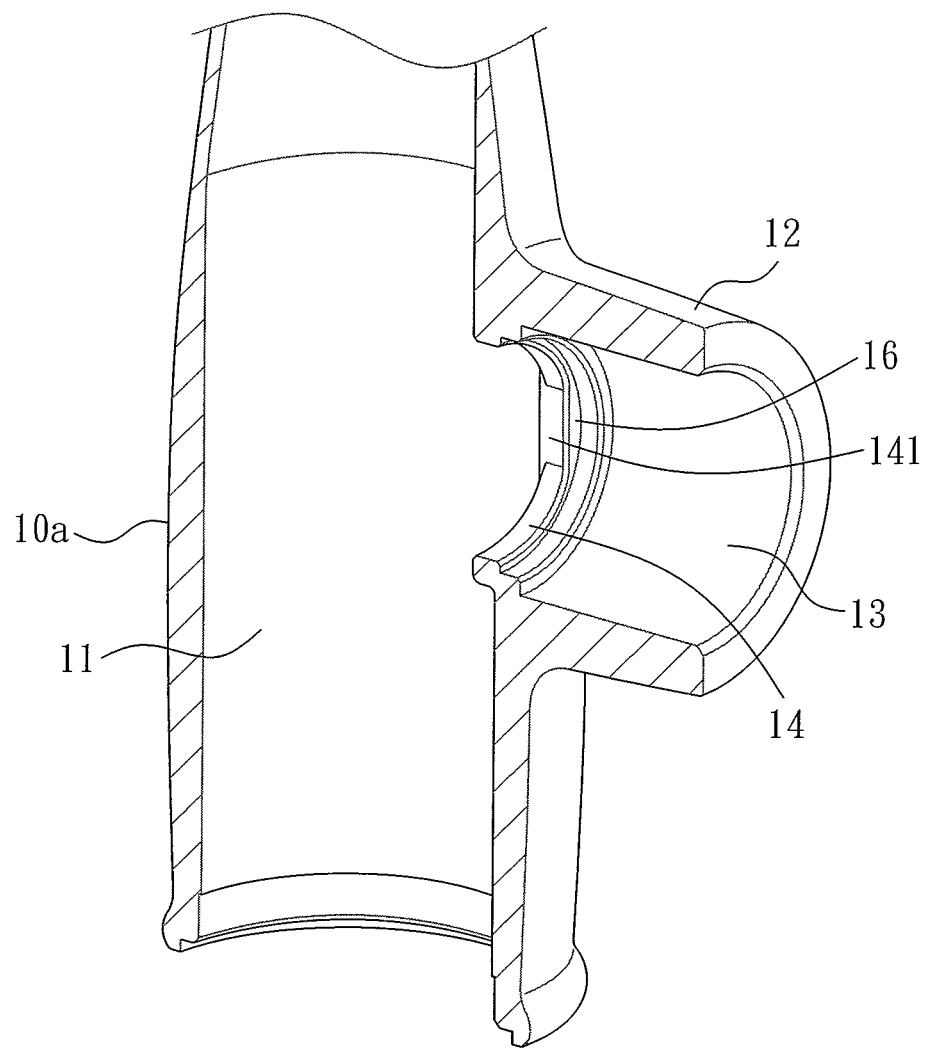
FIG. 26 is a cross sectional view showing the assembly of a part of the pull-out faucet according to the fifth embodiment of the present invention.
Figure 27:
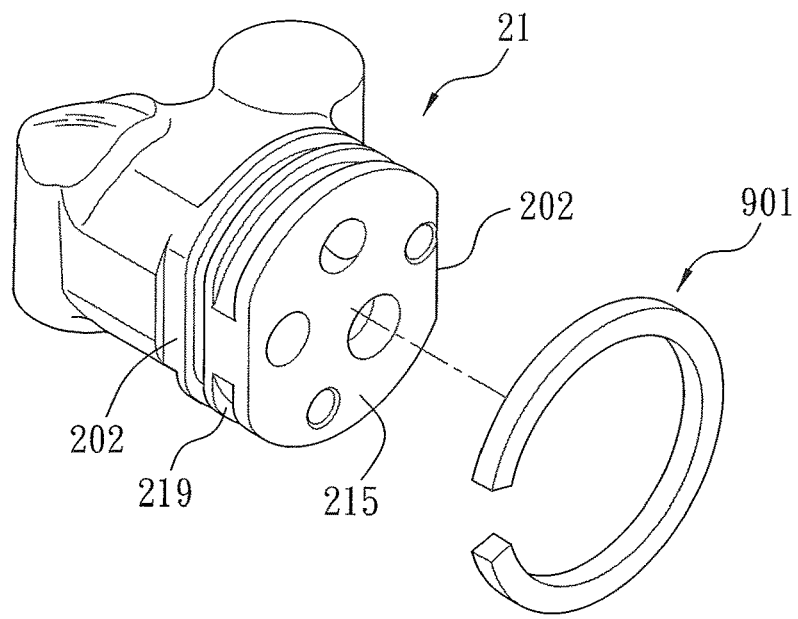
FIG. 27 is a perspective view showing the exploded components of a part of the pull-out faucet according to the fifth embodiment of the present invention.
Figure 28:
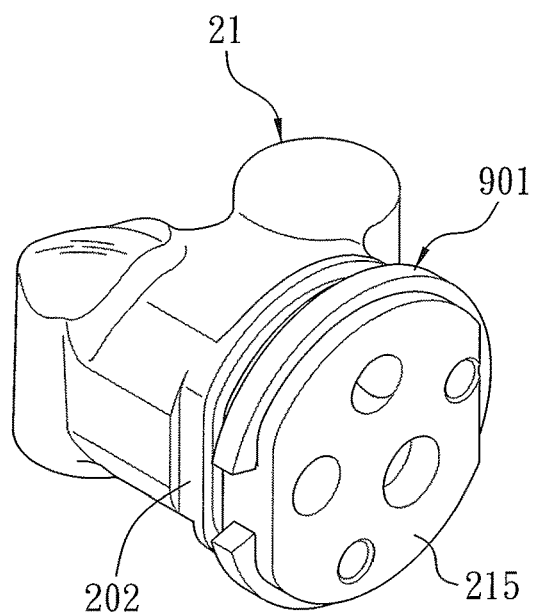
FIG. 28 is a perspective view showing the assembly of a part of the pull-out faucet according to the fifth embodiment of the present invention.

As illustrated FIGS. 21-23, a difference of a pull-out faucet of a fourth embodiment from that of the first embodiment comprises: a positioning element 90 including a C-shaped flexible retainer 91 and a fifth affix ring 92.

The C-shaped flexible retainer 91 has a cutout 911 and an indentation 912 defined on an outer wall of the C-shaped flexible retainer 91 and symmetrical to the cutout 911. The C-shaped flexible retainer 91 is expanded flexibly and is retained in the locking slot 219 of the right-angle valve block 21, and the C-shaped flexible retainer 91 and the right-angle valve block 21 are moved backward until the C-shaped flexible retainer 91 contacts with the first peripheral rib 16 in the accommodation groove 13 so as to stop a removal of the right-angle valve block 21 from the accommodation groove 13. It is to be noted that the cutout 911 and the indentation 912 of the C-shaped flexible retainer 91 are opposite to two first apertures 216 as connecting the pull-out faucet.

The fifth affix ring 92 includes a main part 921 and two columns 922 symmetrically extending from two ends of an inner wall of the main part 921, wherein one of the two columns 922 has a stepped portion 923 formed thereon so that the one column 922 retains in the limitation orifice a via the indentation 912, thus limiting rotation of the right-angle valve block 21. The mixing valve 23 contacts with the peripheral face 215 of the right-angle valve block 21 and an edge cliff 924 of each column 923 so as to limit axial movement of the fifth affix ring 92.

As shown in FIGS. 24-28, a difference of a pull-out faucet of a fifth embodiment from that of the first embodiment comprises: a first orifice 14 of the casing 10a, wherein the first orifice 14 is noncircular, for example, the first orifice 14 has two first planes 141 respectively formed on two opposite sides thereof.

The right-angle valve block 21 has two second planes 202 formed on two sides thereof individually so as to engage with the two first planes 141 of the first orifice 14, thus limiting the rotation of the right-angle valve block 21.

The positioning element 901 is a flexible loop in a C shape, wherein the flexible loop has a rectangular cross section, after the peripheral face 215 of the right-angle valve block 21 moves into the accommodation groove 13 via the first orifice 14, the positioning element 90 retains in the locking slot 219, and the right-angle valve block 21 is pushed backward so that the positioning element 901 contacts with the first peripheral rib 16, thus stopping a removal of the right-angle valve block 21 from the accommodation groove 13. Furthermore, the two second planes 202 of the right-angle valve block 21 engage with the two first planes 141 of the first orifice 14 individually, thus limiting the rotation of the right-angle valve block 21.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A pull-out faucet comprising:
a hollow body, a control valve assembly mounted on the hollow body, a water supply pipe set communicating with the control valve assembly, a water hose communicating with the water supply pipe set so as to supply water, and a spray head disposed on an outlet segment of the hollow body and communicating with the water hose; the hollow body having a longitudinal chamber, an accommodation groove, and a first orifice defined in the accommodation groove and communicating with the longitudinal chamber; wherein the control valve assembly includes:
a right-angle valve block having multiple inlets, an outlet, and multiple apertures, each of the multiple inlets and the outlet respectively communicates with each of the multiple apertures; the right-angle valve block is moved into the longitudinal chamber from a bottom of the hollow body, and one end of the right-angle valve block corresponds to the first orifice enters into the accommodation grove via the first orifice;
a positioning element configured to connect the right-angle valve block so as to accommodate a part of the right-angle valve block in the accommodation groove;
a mixing valve configured to communicate with the multiple apertures;
a first cap configured to position the mixing valve in the accommodation groove; and
an operation lever configured to turn on/off and to control the mixing valve,
wherein the hollow body includes a casing in which the longitudinal chamber is defined, a seat portion horizontally extends outward from the casing, the accommodation groove is formed in the seat portion; the accommodation groove has a first peripheral rib formed around the first orifice and has at least one first fixing hole adjacent to the first peripheral rib,
wherein the right-angle valve block has a first bottom face configured to flow cold water and hot water, and the right-angle valve block has a peripheral face configured to communicate with the mixing valve; the right-angle valve block further has a locking slot proximate to the peripheral face, and the right-angle valve block has at least one second fixing hole extending to the peripheral face via the locking slot; after the right-angle valve block moves into the accommodation groove from the longitudinal chamber via the first orifice, the at least one second fixing hole corresponds to the at least one first fixing hole so that between each of the at least one first fixing orifice and each of the at least one second fixing orifice is defined a limitation orifice, and
wherein the right-angle valve block further has at least one trench extending from the locking slot and located adjacent to the peripheral face of the right-angle valve block; the positioning element includes a first affix ring and a second affix ring; the first affix ring has a first main part and at least one column extending inward from a first internal fringe of the first main part, wherein an outer diameter of a connection of the at least one column is equal to an outer diameter of the first main part, and an inner diameter of the connection of the at least one column is less than an inner diameter of the first main part; each of the at least one column is retained in each second fixing orifice of the right-angle valve block and the limitation orifice of each first fixing orifice so as to limit the rotation of the right-angle valve block; the first main part of the first affix ring has at least one mounting projection extending from an inner wall of the first main part; the second affix ring has a second main part and at least one crook extending inward from a second internal fringe of the second main part, the second main part has at least one securing notch.

2. The pull-out faucet as claimed in claim 1, wherein the right-angle valve block has multiple trenches; the first affix ring has multiple columns and multiple mounting projection; and the second affix ring has multiple crooks and multiple securing notches.

3. A pull-out faucet comprising:
a hollow body, a control valve assembly mounted on the hollow body, a water supply pipe set communicating with the control valve assembly, a water hose communicating with the water supply pipe set so as to supply water, and a spray head disposed on an outlet segment of the hollow body and communicating with the water hose; the hollow body having a longitudinal chamber, an accommodation groove, and a first orifice defined in the accommodation groove and communicating with the longitudinal chamber; wherein the control valve assembly includes:

a right-angle valve block having multiple inlets, an outlet, and multiple apertures, each of the multiple inlets and the outlet respectively communicates with each of the multiple apertures; the right-angle valve block is moved into the longitudinal chamber from a bottom of the hollow body, and one end of the right-angle valve block corresponds to the first orifice enters into the accommodation grove via the first orifice;

a positioning element configured to connect the right-angle valve block so as to accommodate a part of the right-angle valve block in the accommodation groove;

a mixing valve configured to communicate with the multiple apertures;

a first cap configured to position the mixing valve in the accommodation groove; and an operation lever configured to turn on/off and to control the mixing valve, wherein the hollow body includes a casing in which the longitudinal chamber is defined, a seat portion horizontally extends outward from the casing, the accommodation groove is formed in the seat portion; the accommodation groove has a first peripheral rib formed around the first orifice and has at least one first fixing hole adjacent to the first peripheral rib, wherein the right-angle valve block has a first bottom face configured to flow cold water and hot water, and the right-angle valve block has a peripheral face configured to communicate with the mixing valve; the right-angle valve block further has a locking slot proximate to the peripheral face, and the right-angle valve block has at least one second fixing hole extending to the peripheral face via the locking slot; after the right-angle valve block moves into the accommodation groove from the longitudinal chamber via the first orifice, the at least one second fixing hole corresponds to the at least one first fixing hole so that between each of the at least one first fixing orifice and each of the at least one second fixing orifice is defined a limitation orifice, and wherein the positioning element includes a third affix ring and a fourth affix ring which are semicircular, wherein each of the third affix ring and the fourth affix ring has at least one extensions and at least one column.

4. A pull-out faucet comprising:

a hollow body, a control valve assembly mounted on the hollow body, a water supply pipe set communicating with the control valve assembly, a water hose communicating with the water supply pipe set so as to supply water, and a spray head disposed on an outlet segment of the hollow body and communicating with the water hose; the hollow body having a longitudinal chamber, an accommodation groove, and a first orifice defined in the accommodation groove and communicating with the longitudinal chamber; wherein the control valve assembly includes:

a right-angle valve block having multiple inlets, an outlet, and multiple apertures, each of the multiple inlets and the outlet respectively communicates with each of the multiple apertures; the right-angle valve block is moved into the longitudinal chamber from a bottom of the hollow body, and one end of the right-angle valve block corresponds to the first orifice enters into the accommodation grove via the first orifice;

a positioning element configured to connect the right-angle valve block so as to accommodate a part of the right-angle valve block in the accommodation groove;

a mixing valve configured to communicate with the multiple apertures;

a first cap configured to position the mixing valve in the accommodation groove; and an operation lever configured to turn on/off and to control the mixing valve, wherein the hollow body includes a casing in which the longitudinal chamber is defined, a seat portion horizontally extends outward from the casing, the accommodation groove is formed in the seat portion; the accommodation groove has a first peripheral rib formed around the first orifice and has at least one first fixing hole adjacent to the first peripheral rib, wherein the right-angle valve block has a first bottom face configured to flow cold water and hot water, and the right-angle valve block has a peripheral face configured to communicate with the mixing valve; the right-angle valve block further has a locking slot proximate to the peripheral face, and the right-angle valve block has at least one second fixing hole extending to the peripheral face via the locking slot; after the right-angle valve block moves into the accommodation groove from the longitudinal chamber via the first orifice, the at least one second fixing hole corresponds to the at least one first fixing hole so that between each of the at least one first fixing orifice and each of the at least one second fixing orifice is defined a limitation orifice, and wherein the positioning element includes a C-shaped flexible retainer and a fifth affix ring; the C-shaped flexible retainer has a cutout and an indentation defined on an outer wall of the C-shaped flexible retainer and symmetrical to the cutout; the cutout and the indentation of the C-shaped flexible retainer are opposite to two first apertures; the fifth affix ring includes a main part and two columns symmetrically extending from two ends of an inner wall of the main part, wherein one of the two columns has a stepped portion formed thereon; wherein one of the two columns retains in one limitation orifice via the indentation, and the mixing valve contacts with the peripheral face of the right-angle valve block and an edge cliff of each column.

5. The pull-out faucet as claimed in claim 4, wherein mixing valve contacts with the peripheral face of the right-angle valve block and an edge cliff of each column so as to limit axial movement of the fifth affix ring.

6. A pull-out faucet comprising:

a hollow body, a control valve assembly mounted on the hollow body, a water supply pipe set communicating with the control valve assembly, a water hose communicating with the water supply pipe set so as to supply water, and a spray head disposed on an outlet segment of the hollow body and communicating with the water hose; the hollow body having a longitudinal chamber, an accommodation groove, and a first orifice defined in the accommodation groove and communicating with the longitudinal chamber; wherein the control valve assembly includes:

a right-angle valve block having multiple inlets, an outlet, and multiple apertures, each of the multiple inlets and the outlet respectively communicates with each of the multiple apertures; the right-angle valve block is moved into the longitudinal chamber from a bottom of the hollow body, and one end of the right-angle valve block corresponds to the first orifice enters into the accommodation grove via the first orifice;

a positioning element configured to connect the right-angle valve block so as to accommodate a part of the right-angle valve block in the accommodation groove;

a mixing valve configured to communicate with the multiple apertures;

a first cap configured to position the mixing valve in the accommodation groove; and an operation lever configured to turn on/off and to control the mixing valve, wherein the hollow body includes a casing in which the longitudinal chamber is defined, a seat portion horizontally extends outward from the casing, the accommodation groove is formed in the seat portion; the accommodation groove has a first peripheral rib formed around the first orifice and has at least one first fixing hole adjacent to the first peripheral rib, wherein the right-angle valve block has a first bottom face configured to flow cold water and hot water, and the right-angle valve block has a peripheral face configured to communicate with the mixing valve; the right-angle valve block further has a locking slot proximate to the peripheral face, and the right-angle valve block has at least one second fixing hole extending to the peripheral face via the locking slot; after the right-angle valve block moves into the accommodation groove from the longitudinal chamber via the first orifice, the at least one second fixing hole corresponds to the at least one first fixing hole so that between each of the at least one first fixing orifice and each of the at least one second fixing orifice is defined a limitation orifice, and wherein the first orifice between the longitudinal chamber and the accommodation groove is noncircular; the first orifice has two first planes respectively formed on two opposite sides thereof so the right-angle valve block is retained in the first orifice; the positioning element is a flexible loop in a C shape and is retained in the locking slot, thus stopping a removal of the right-angle valve block from the accommodation groove.

7. The pull-out faucet as claimed in claim 6, wherein the first orifice has two first planes respectively formed on two opposite sides thereof; the right-angle valve block has two second planes formed on two sides thereof individually so as to engage with the two first planes of the first orifice; the positioning element is fixed on the first peripheral rib.

* * * * *